US012716911B2

(12) United States Patent
Kreutzer et al.

(10) Patent No.: US 12,716,911 B2
(45) Date of Patent: Aug. 25, 2026

(54) METHOD FOR ASSESSING THE STATE OF A SENSOR AS WELL AS SENSOR SYSTEM AND METHOD FOR OPERATING THE SENSOR SYSTEM

(71) Applicant: Robert Bosch GmbH, Stuttgart (DE)

(72) Inventors: Joachim Kreutzer, Stuttgart (DE); David Slogsnat, Tuebingen (DE); Gabriele Cazzaniga, Rosate MI (IT); Massimiliano Musazzi, Como/Lombardia (IT); Timon Brueckner, Sonnenbuehl (DE)

(73) Assignee: ROBERT BOSCH GMBH, Stuttgart (DE)

( * ) Notice: Subject to any disclaimer, the term of this patent is extended or adjusted under 35 U.S.C. 154(b) by 195 days.

(21) Appl. No.: 18/040,185

(22) PCT Filed: Jul. 15, 2021

(86) PCT No.: PCT/EP2021/069731
§ 371 (c)(1),
(2) Date: Feb. 1, 2023

(87) PCT Pub. No.: WO2022/028842
PCT Pub. Date: Feb. 10, 2022

(65) Prior Publication Data

US 2023/0273236 A1 Aug. 31, 2023

(30) Foreign Application Priority Data

Aug. 5, 2020 (DE) ..................... 10 2020 209 856.5

(51) Int. Cl.
*G01P 15/125* (2006.01)
*G01P 1/00* (2006.01)

(52) U.S. Cl.
CPC .............. *G01P 15/125* (2013.01); *G01P 1/00* (2013.01)

(58) Field of Classification Search
CPC ..................................................... G01P 15/125
(Continued)

(56) References Cited

U.S. PATENT DOCUMENTS

2008/0173091 A1* 7/2008 McNeil ................. G01P 15/125 73/514.32
2010/0052597 A1 3/2010 Dong et al.
(Continued)

FOREIGN PATENT DOCUMENTS

EP 3470861 B1 11/2019
GB 2560767 A 9/2018
(Continued)

OTHER PUBLICATIONS

Xu, Jiushuai, et al. "Piezoresistive microcantilevers for humidity sensing." Journal of Micromechanics and Microengineering 29.5 (2019): 053003. (Year: 2019).*
(Continued)

*Primary Examiner* — Walter L Lindsay, Jr.
*Assistant Examiner* — Philip T Fadul
(74) *Attorney, Agent, or Firm* — NORTON ROSE FULBRIGHT US LLP

(57) ABSTRACT

A method for assessing the state of a sensor. The sensor comprises a deflectable micromechanical sensor structure for detecting a physical input variable and converting the physical input variable into an electrical sensor signal. A medium surrounding the sensor acts on the micromechanical sensor structure. The micromechanical sensor structure is deflectable using an excitation signal. The method includes: generating an excitation signal using a driver unit; outputting the excitation signal to the micromechanical sensor
(Continued)

structure; deflecting the micromechanical sensor structure using the excitation signal; detecting a response behavior of the micromechanical sensor structure in response to the excitation signal; comparing the response behavior to a reference behavior to determine a measure of deviation for the response behavior in relation to the reference behavior; and assessing, based on the measure of deviation, the state of the sensor with respect to the presence of a deposit.

17 Claims, 5 Drawing Sheets

(58) Field of Classification Search
USPC ........................................................ 73/514.35
See application file for complete search history.

(56) References Cited

U.S. PATENT DOCUMENTS

2010/0288015 A1 11/2010 Adams et al.
2012/0190131 A1 7/2012 Novotny
2015/0362362 A1 12/2015 Pan et al.
2016/0167961 A1 6/2016 Dar et al.
2017/0283249 A1* 10/2017 Dogiamis ............. B81C 1/0015
2017/0328712 A1 11/2017 Collin et al.
2018/0052185 A1 2/2018 Kniffin et al.
2019/0383688 A1 12/2019 Balasubramanian et al.

FOREIGN PATENT DOCUMENTS

TW 201947194 A 12/2019
WO 2007017383 A1 2/2007
WO 2008022183 A1 2/2008
WO 2010145762 A2 12/2010
WO 2020023414 A1 1/2020

OTHER PUBLICATIONS

Kim et al. "Static and dynamic operation of metal-coated hydrogel cantilever humidity sensors based on hygroscopic mismatch." 2017 19th International Conference on Solid-State Sensors, Actuators and Microsystems (Transducers). IEEE, 2017. (Year: 2017).*
International Search Report for PCT/EP2021/069731, Issued Oct. 20, 2021.
Xu et al., "Piezoresistive Microcantilevers for Humidity Sensing," Journal of Micromechanics and Microengineering, vol. 29, No. 5, 2019, p. 1-66.

* cited by examiner 10
14
16
reference voltage source
18
offset voltage source
19
17
20
15
26
assessment unit
27
comparator
25
24
A/D
23
22
19
21
11
13
12
$U_B$
1

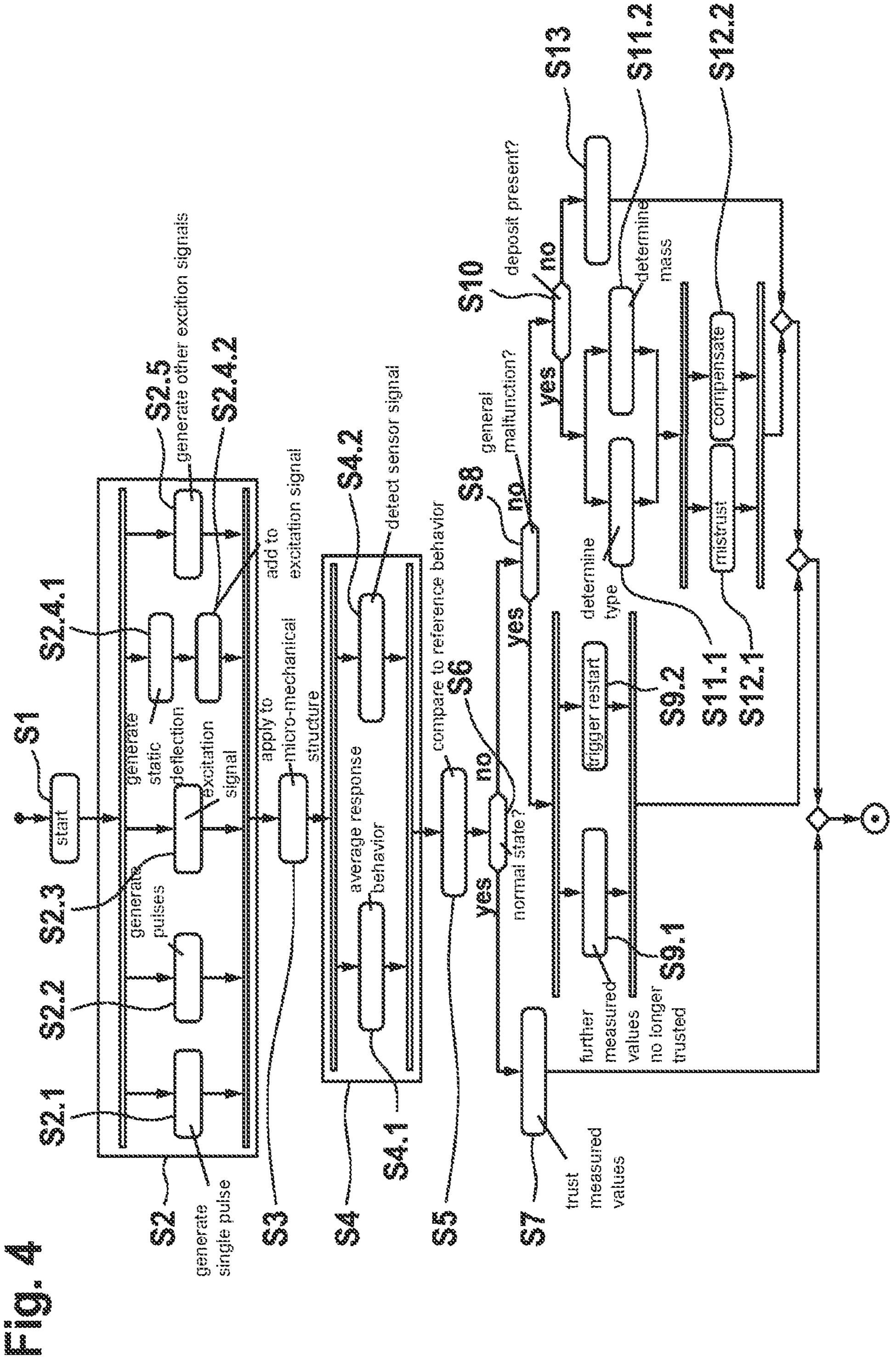
Fig. 4
S1
start
S2
generate single pulse
S2.1
S2.2
generate pulses
S2.3
generate static deflection
S2.4.1
excitation signal
S2.4.2
add to excitation signal
S2.5
generate other excition signals
S3
apply to micro-mechanical structure
S4
S4.1
average response behavior
S4.2
detect sensor signal
S5
compare to reference behavior
S6
normal state?
yes
no
S7
trust measured values
S8
general malfunction?
S9.1
further measured values no longer trusted
S9.2
trigger restart
S10
deposit present?
S11.1
determine type
S11.2
determine mass
S12.1
mistrust
S12.2
compensate
S13

METHOD FOR ASSESSING THE STATE OF A SENSOR AS WELL AS SENSOR SYSTEM AND METHOD FOR OPERATING THE SENSOR SYSTEM

FIELD

The present invention relates to a method for assessing the state of a sensor, the sensor comprising a deflectable micromechanical sensor structure for detecting a physical input variable and for converting the physical input variable into an electrical sensor signal, a medium surrounding the sensor acting directly or indirectly on the micromechanical sensor structure, and the micromechanical sensor structure being deflectable by means of an excitation signal.

The present invention further relates to a corresponding sensor system, as well as a method for operating the sensor system.

BACKGROUND INFORMATION

MEMS—Micro-Electro-Mechanical System—sensors are often used in practice. In this context, the influence of a physical input variable on a micromechanical sensor structure of the MEMS sensor is used, and the resulting change of an electrical variable, e.g., a capacitance, is detected and evaluated. By virtue of their small size, MEMS sensors can be particularly well integrated into portable devices, such as smartphones, smartwatches, or fitness trackers, but can also be used in a variety of other use scenarios, e.g., in IoT or Internet of Things applications or automotive applications.

When a micromechanical sensor structure is exposed to a surrounding medium, deposits may form on the sensor or the micromechanical sensor structure, which may interfere with the measurement behavior of the sensor and may distort the measured values obtained. Even if a micromechanical sensor structure is protected from direct contact with an environment by means of a protective agent, e.g., a gel or oil, and the surrounding medium therefore only indirectly acts on the micromechanical sensor structure, deposits on the protective agent can negatively affect the measuring behavior. Therefore, measures are available which can be used to respond to such deposits.

In some sensor systems, liquid deposits are detected by means of additional detection devices. For example, reference is made to PCT Patent Application No. WO 2020/023414 A1 and U.S. Patent Application Publication No. US 2019/0383688 A1. The disadvantage of these solutions is that the space requirements and the costs of the sensor increase due to the addition of detection devices of this kind.

In other systems, options are created for recalibrating the sensor, which make it possible to respond to a changed behavior of the sensor. In U.S. Patent Application Publication No. US 2018/0052185 A1 a transfer function of a converter is determined on the basis of a response to an electrical signal input. Parameters for calibrating the converter are determined from this.

SUMMARY

In one example embodiment, the present invention provides a method for evaluating the state of a sensor, the sensor comprising a deflectable micromechanical sensor structure for detecting a physical input variable and for converting the physical input variable into an electrical sensor signal, a medium surrounding the sensor acting directly or indirectly on the micromechanical sensor structure, and the micromechanical sensor structure being deflectable by means of an excitation signal, said method comprising the following steps:

- generating an excitation signal by means of a driver unit, wherein the excitation signal exhibits at least an amplitude change,
- outputting the excitation signal to the micromechanical sensor structure,
- deflecting the micromechanical sensor structure by means of the excitation signal,
- detecting a response behavior of the micromechanical sensor structure in response to the excitation signal,
- comparing the response behavior to a reference behavior for determining a measure of deviation for the response behavior relative to the reference behavior, and
- assessing, based on the measure of deviation, the state of the sensor with respect to the presence of a deposit.

In a further example embodiment, the present invention provides a sensor system comprising at least:

- a sensor having a deflectable micromechanical sensor structure for detecting a physical input variable and for converting the physical input variable into an electrical sensor signal, a medium surrounding the sensor acting directly or indirectly on the micromechanical sensor structure, and the micromechanical sensor structure being deflectable by means of an excitation signal,
- a driver unit designed to generate and output an excitation signal, the excitation signal exhibiting at least an amplitude change,
- an evaluation unit designed to determine a response behavior of the micromechanical sensor structure in reaction to the excitation signal, and to form a measure of deviation based on a comparison of the response behavior with a reference behavior, and
- an assessment unit designed to assess, based on the measure of deviation, the state of the sensor with respect to the presence of a deposit.

In yet another example embodiment, the present invention provides a method for operating a sensor system according to an embodiment described herein, in which a physical input variable is detected and converted into an electrical sensor signal, an embodiment of the method described herein for assessing the state of the sensor preferably being performed automatically at regular intervals, and/or in an event-initiated manner, and/or initiated by a host system.

If a surrounding medium acts—directly or indirectly—on a micromechanical structure, deposits from this surrounding medium may develop on or at the micromechanical sensor structure. A deposit can result in a change of the mass which interacts with the micromechanical sensor structure. A deposit can also alter the flexibility of the micromechanical sensor structure, e.g., if the extensibility or an oscillation travel of the micromechanical sensor structure is impaired. This exemplary and non-exhaustive enumeration shows that deposits have an influence on the mechanical and/or electrical properties of the micromechanical sensor structure and that characteristics of the oscillation, e.g., oscillation frequency, natural frequency, attenuation, oscillation amplitude and/or phase position, can change as a result of the deposits. If the micromechanical sensor structure is excited—dynamically—by a known excitation signal and a response behavior is detected in response to this excitation signal, it is therefore possible to draw conclusions about the presence of a deposit.

A "surrounding medium" is a medium that surrounds the sensor and that directly or indirectly acts on the micromechanical sensor structure. This conventionally means that the micromechanical sensor structure is not encapsulated in a housing, but rather that the surrounding medium is able to reach the micromechanical sensor structure from outside the sensor. In one embodiment, the surrounding medium comprises air or, generally, a gas. In another embodiment, the surrounding medium comprises a liquid, e.g., water. In practice, a surrounding medium will not be pure. For example, air typically comprises evaporated liquids, dust, and other particles.

The "deposits" may comprise liquids (e.g., water, oil, sweat, or other body fluids), solids (e.g., dirt, salt, particles, or fibers), rigid structures (e.g., biofilms), and/or other substances/structures. A deposit can be formed directly from the surrounding medium, e.g., by the condensation of moisture. However, it is also possible for a deposit to form from the surrounding medium by chemical and/or biological processes. Most often, this means that one deposit is formed from another deposit. A deposit may be present only temporarily. Thus, a liquid condensed from the surrounding medium may evaporate. However, a deposit may also be present permanently, i.e., a cleaning procedure or other measure is required to remove the deposit.

The term "response behavior" refers very generally to a mechanical and/or electrical response of the micromechanical sensor structure to an excitation signal. This response behavior can be characterized by various parameters. In one embodiment, frequency, amplitude, phase position (based on the excitation signal or also between current and voltage), attenuation, spectral components and/or a time curve are used for this purpose.

Accordingly, the term "reference behavior" is to be understood in a general manner, whereby a reference behavior characterizes a known state of the sensor. A reference behavior may be described by a parameter or a set of parameters. It is possible that the response behavior and the reference behavior be characterized by the same parameters, which may make it easier to compare the response behavior with a reference behavior. However, it is also possible that a parameter of a reference behavior be converted into a parameter of a response behavior, or vice versa.

Said "comparison of the response behavior with a reference behavior" and "determining a measure of deviation" may be performed in different ways. It is determined how "close" a detected response behavior is to a known reference behavior, or how "far" away the detected response behavior is from a known reference behavior. Accordingly, the measure of deviation indicates the "distance" between a detected response behavior and a reference behavior. Given that the state of a reference, which is characterized by a reference behavior, is known, the measure of deviation describes how close or far away the state of a sensor currently being examined is from the state of the reference. Thus, a check is performed to determine how well a response behavior matches a reference behavior. In this manner, a detected response behavior may be classified and an assessment of the state of the sensor may be performed.

Further features, advantages, and additional embodiments of the present invention are disclosed herein.

In one example embodiment of the present invention, a retroactive effect of the micromechanical sensor structure on the excitation signal is detected in the step of detecting the response behavior. This makes use of the fact that the micromechanical sensor structure or its reaction to the excitation signal is able to measurably influence one or more characteristics of the excitation signal. This influence can be captured and used as a measure of a response behavior. In one embodiment, the retroactive effect is determined by analyzing the relationship between current and voltage, e.g., by determining the mechanical impedance, the electrical impedance, or the quality factor. In one embodiment, a determination of the retroactive effect is made based on a frequency, e.g., by determining the natural frequency or the resonance frequency. Detecting the response behavior from a retroactive effect of the micromechanical sensor structure on the excitation signal offers the advantage that the evaluation and the required evaluation unit can be simplified.

In one example embodiment of the present invention, which can be performed as an alternative or in addition to detecting a retroactive effect of the micromechanical sensor structure, a response signal is detected during the step of detecting the response behavior, in which case the response signal is formed by a sensor signal of the sensor upon deflection of the micromechanical sensor structure by the excitation signal. How the response signal is specifically generated depends on the sensor itself and the type of circuitry. For example, if the sensor were part of a Wheatstone bridge, the excitation signal would be applied to the ends of the Wheatstone bridge, and the sensor signal would be formed by the bridge voltage. Other means of generating a sensor signal are sufficiently understood from practical experience. The separate detection of a sensor signal in order to indicate the response behavior provides the advantage that the excitation signal may be shorter, which has a positive effect on energy consumption and the required measurement time. In addition, synergetic effects can be achieved, particularly when detecting the response behavior during pauses in measurement operation of the sensor, because an evaluation unit can be used for both detecting the response behavior and providing or obtaining a measured value for the physical input variable.

In an example embodiment of the detection of a response signal, the excitation signal can be adjusted in such a way in the step of generating an excitation signal that a desired response signal is detected. As a result, the evaluation of the response behavior can be simplified.

The excitation signal exhibits at least an amplitude change such that no static excitation signal is to be used, and the micromechanical sensor structure is to be dynamically deflected. The specificity of this amplitude change is not crucial.

In one example embodiment of the present invention, the excitation signal is generated as a single pulse, as a plurality of pulses, as a periodic oscillation of constant or variable frequency, and/or as a variously shaped single or repeated pattern. In this case, a DC voltage may be superimposed on the excitation signal, as a result of which the micromechanical sensor structure can be brought into a range of higher sensitivity in some sensors. A single pulse or multiple pulses means a single or multiple short-term change(s) from a resting position. For example, a resting position may be at 0 volt, from which the excitation signal moves in the millisecond range in rectangular fashion to a higher or lower voltage, e.g., 1.4 volt or 0.8 volt. An excitation signal can in this way be generated with little effort. One embodiment of the excitation signal, as an oscillation, can include a periodically variable signal. The oscillation can in this case assume a variety of forms. By way of example, said forms may include—but are not limited to—rectangular, sinusoidal, sawtooth, or triangular signals. When using a variable frequency oscillation, a few discrete frequency stages may be used, which are adopted sequentially. However, it is also possible that the frequency be (quasi-)continuously increased or reduced. The excitation signal may be adjusted to various possible deposits in this way. An embodiment of the excitation signal as a variously shaped single or repeated pattern can be formed by a sequence comprising various portions of the excitation signal. In this case, one portion can be separated from a subsequent portion by a signal pause. In one embodiment, such a pattern is formed by a first portion having a first frequency, a signal pause, a second portion having a second frequency, a signal pause, and a third portion having a third frequency. In one embodiment, such a pattern is formed by a first part in the form of a pulse, a signal pause, and a second part in the form of a periodic oscillation. These examples of possible embodiments show how flexible the use of a pattern can be. Such patterns may be output once or repeatedly. The use of a pattern may achieve and/or improve the ability to distinguish among various deposits. The specific choice of embodiment of the excitation signal may be based on experiments, calculations, and/or simulations. Therefore, certain excitation signals may be more suitable for detecting a first deposit than for detecting a second deposit. Depending on the expected deposit, a specific excitation signal having a specific amplitude, frequency, shape, and/or profile can be selected.

In one example embodiment of the present invention, during the step for detecting a response behavior, a frequency of a sensor signal, an amplitude of a sensor signal, a resonance frequency, a quality factor, a mechanical impedance, an electrical impedance, a natural frequency, and/or other characteristics of a response behavior of the micromechanical sensor structure can be determined. Doing so enables the response behavior to be detected in an extremely versatile manner.

In one example embodiment of the present invention, the reference behavior represents a normal state of the sensor and, during the step of comparing the response behavior with the reference behavior, an assessment is made of how far away the micromechanical sensor structure is from the normal state, and/or whether an error state of the sensor exists. It could be decided that a normal state exists if the measure of deviation is below a predefined limit value. A decision could be made that an error state exists if the measure of deviation is above a predefined limit value, in which case the limit value for the normal state may deviate from the limit for the error state. An intermediate range for the measure of deviation can also be defined, within which a range can lie between a normal state and an error state. The comparison with a normal state makes it possible to detect whether the sensor is blocked in such a way that the micromechanical sensor structure moves only in a limited manner or is no longer moving at all.

In one example embodiment of the present invention, the reference behavior represents a micromechanical sensor structure influenced by a deposit, the deposit preferably being formed by a liquid, a solid, or a solid structure. In this case, during the step of comparing the response behavior with the reference behavior, an assessment would be made to determine how close the behavior of the micromechanical sensor structure is to a behavior of a micromechanical sensor structure influenced by the deposit. It can be decided that the deposit characterized by the reference behavior exists if the measure of deviation is below a predefined limit value. It is also possible that one or multiple response behaviors be compared with a plurality of such reference behaviors. A distinction can in this way be made between multiple deposits.

These example embodiments of the present invention regarding the use of reference behaviors can also be combined. In such a combination, a reference behavior that characterizes a normal state of the sensor may first be used to check whether there exists a general problem with the sensor. If the answer is no, then the method may continue with a comparison with one or more reference behaviors which characterize a deposit. A reference behavior can be obtained in a variety of ways. In one embodiment, the reference behavior can be determined in an initial measurement, which is particularly advantageous for the comparison with a normal state. In one embodiment, the reference behavior may have been determined in a previous measurement. This makes it possible to determine whether the state of the sensor is degrading. On the other hand, upon detection of a deposit in a previous measurement, a check may be performed to determine whether the deposit is still present or whether in the meantime is no longer present, e.g., due to evaporation or cleaning.

A reference behavior characterizing a deposit may have been recorded at the specific sensor to be assessed by intentionally producing a particular deposit, e.g., by applying a liquid deposit. Such a reference behavior, however, may also have been determined in a measurement on a structurally identical sensor, in a simulation and/or by a calculation.

A reference behavior may be defined based on one or multiple measurement points, and interpolations or extrapolations may be made based on one or multiple known measurement points.

When a deposit and/or absence of a normal state is detected, various responses can be made. In one example embodiment of the present invention, during the step for assessing the state of the sensor, a reliability of obtained sensor data is determined and/or a measure for an error correction is obtained as a function of the reference behavior and the measure of deviation. Alternatively or additionally, additional measures may be initiated during the step of assessing the sensor, preferably a restoration of the normal state, a status update, a deactivation of the sensor, and/or other mitigation measures. A host system connected to the sensor may be used to signal a deposit or an error state.

In one example embodiment of the present invention, an energy-rich excitation signal may be used to restore a normal state via a suitable deflection of the micromechanical sensor structure. Such a "suitable deflection" of the micromechanical sensor structure may act to break up solid structures formed by deposits, or to remove deposits. The changes can thereby be reversed, and the response behavior can approximate the normal state. In this context, an "energy-rich signal" is understood to mean that this signal causes a deflection exceeding a deflection during a measurement. Depending on the extent and/or type of deposit, this deflection may reach the stress limit of the micromechanical structure.

In one example embodiment of the present invention, the assessment of the sensor state and the initiation of additional measures is performed in the form of a control loop. If a state requiring correction is detected, then additional measures are initiated, and the success of these measures is verified by means of an embodiment of the method. If the need for correction continues to exists, then additional measures will be triggered again, and so on. In particular, in the case of an additional measure by restoring the normal state, e.g., by means of a high-energy oscillation, it can be checked in this way whether the measures can actually restore a normal state.

In one example embodiment of the sensor system of the present invention, the evaluation unit is a component of the driver unit. This embodiment is particularly suitable if the response behavior is determined from a retroactive effect of the micromechanical sensor structure on the excitation signal.

In one example embodiment of the sensor system of the present invention, the driver unit and the evaluation unit are configured as separate units. This embodiment is appropriate if the response behavior is obtained from a sensor signal.

In one example embodiment of the present invention, the driver unit and the evaluation unit are configured to be used for providing a measured value for the physical input variable during a measurement operation and, during a pause in the measurement operation, for assessing the state of the sensor. In this way, a verification of the status of the sensor is not limited to a final check immediately after manufacture of the sensor. A verification can instead be performed during the ongoing operation of the sensor and in the respective usage scenario. A pause in the measurement operation does not necessarily mean that the sensor is placed in any kind of "maintenance mode." Rather, there is always a pause in the measurement operation when no measured values are currently being detected. Given that a sensor usually does not permanently obtain measured values, but that there are rather typically pauses between the detection of measured values, e.g., of several milliseconds, single or several seconds, or in the minute range, enough pauses remain which can be used to check the status.

In one example embodiment of the present invention, the sensor system comprises a host system, the host system being communicatively connected via an interface to the evaluation unit and/or the assessment unit. This host system can be configured to initiate an assessment of the sensor state and/or implement at least parts of the assessment unit.

In one example embodiment of the present invention, the sensor system is configured to perform the method according to the present invention. The method may be performed at regular intervals. Performance of the method may be triggered automatically, by a specific event or by a host system connected to the sensor. An automatic triggering may include performing an assessment of the state of the sensor after a predefined period of time has elapsed. This period of time may be one or more days, one or more hours, 30 minutes, 15 minutes, or one or more minutes, just to name a few possible examples. A specific event can be a start of an electronics of the sensor, a switch from an idle state to an active state—or vice versa—or a presence of a particular value in a trigger register. The latter may also be used by a host system in order to trigger performance of the method. A host system, however, may also comprise a different type of interface for triggering a check of the sensor state.

Further features and advantages of the present invention arise from the disclosure herein, including from the figures and from the associated description of the figures with reference to figures.

It is understood that the aforementioned features and the features yet to be explained below can be used not only in the respectively specified combination, but also in other combinations, or alone, without departing from the scope of the present invention.

Preferred embodiments and embodiment variants of the present invention are set forth in the figures and will be explained in greater detail in the following, where like reference numerals refer to like, similar, or functionally equal components or elements.

BRIEF DESCRIPTION OF THE DRAWINGS

FIG. 4 shows a flow diagram for an embodiment of a method according to the present invention for assessing the state of a sensor.

DETAILED DESCRIPTION OF EXAMPLE EMBODIMENTS

Figure 1:
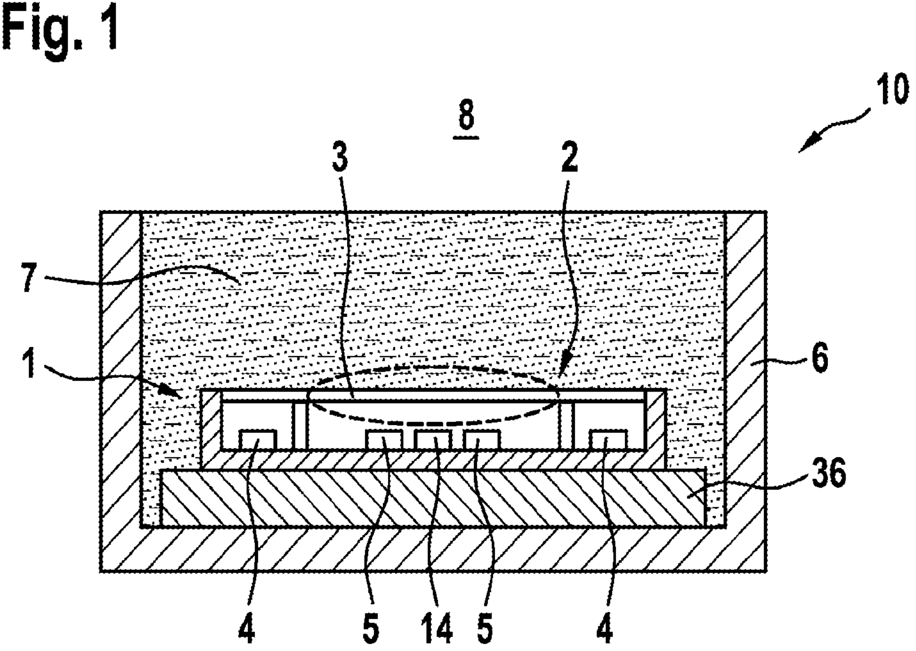
FIG. 1 shows a schematic cross-sectional drawing through a sensor comprising a micromechanical sensor structure, according to an example embodiment of the present invention.
Figure 2:
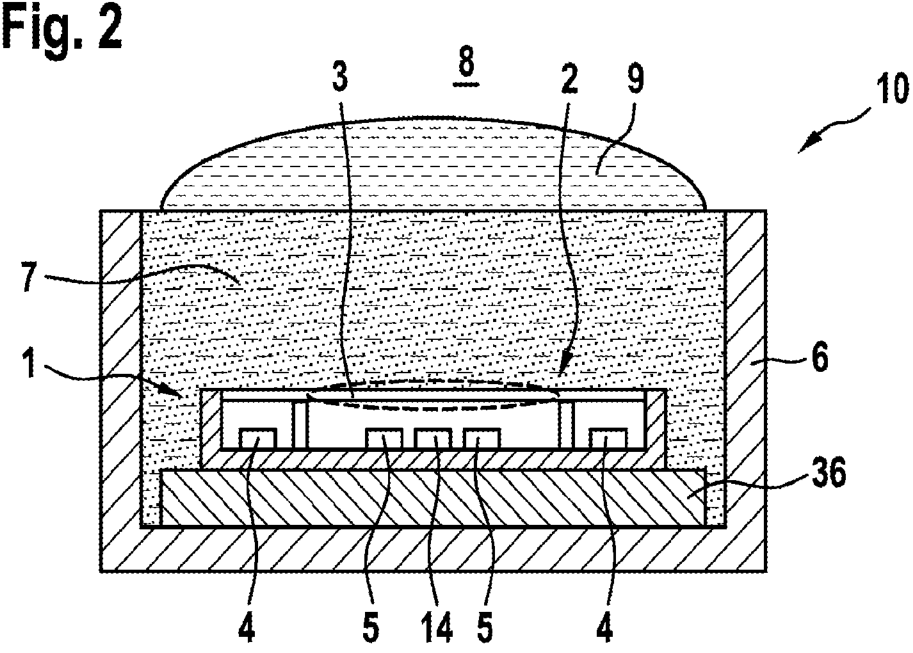
FIG. 2 shows a schematic cross-sectional drawing through the sensor according to FIG. 1 with a liquid droplet as a deposit on the micromechanical sensor structure.

FIGS. 1 and 2 show a schematic cross-sectional drawing through a sensor 1 having a micromechanical sensor structure 2, which can be used in the context of the present invention. The sensor 1 is formed by a pressure sensor comprising a deflectable micromechanical sensor structure 2. The sensor structure 2 comprises elastically suspended electrode 3 as well as two fixedly arranged reference electrodes 4 and two fixedly arranged measuring electrodes 5. The electrode 3, together with the two measuring electrodes 5, forms two sensor capacitors and, together with the two reference electrodes, two reference capacitors. The sensor capacitors and reference capacitors are connected as a Wheatstone bridge. The sensor 1 is part of a sensor system 10, which additionally comprises a driver unit 14 for generating excitation signals for deflecting the elastically suspended electrode 3. The deflection is indicated as a dashed line. The micromechanical sensor structure 2 is arranged in an upwardly open housing 6 and is protected by a protective means 7, e.g., a gel. A surrounding medium 8 surrounding the sensor 1 thereby indirectly acts on the micromechanical sensor structure 2. If a pressure of the surrounding medium 8 changes, this changing pressure affects the distance of the electrode 3 relative to the measuring electrodes 5, whereby the capacitances formed by the micromechanical sensor structure measurably change.

The sensor system further comprises an evaluation unit and an assessment unit, which are implemented in an ASIC—Application Specific Integrated Circuit—36, and which are likewise located in the housing 6. The evaluation unit is configured to determine a response behavior of the micromechanical sensor structure 2 in response to the excitation signal, and to form a measure of deviation based on a comparison of the response behavior with a reference behavior. The assessment unit is configured to assess the state of the sensor 1 with respect to the presence of a deposit, based on the measure of deviation.

FIG. 2 illustrates a case in which a deposit 9 has formed on the protection means 7. In the case illustrated, the deposit 9 is formed by a droplet of water. This deposit 9 affects the measurements of the sensor 1. An excitation signal is only able to deflect the electrode 3 to a lesser extent, which is illustrated by the different amplitudes of the deflection of the elastically suspended electrode 3 in FIGS. 1 and 2. The presence of this deposit can be determined using the method described herein.

Figure 3:
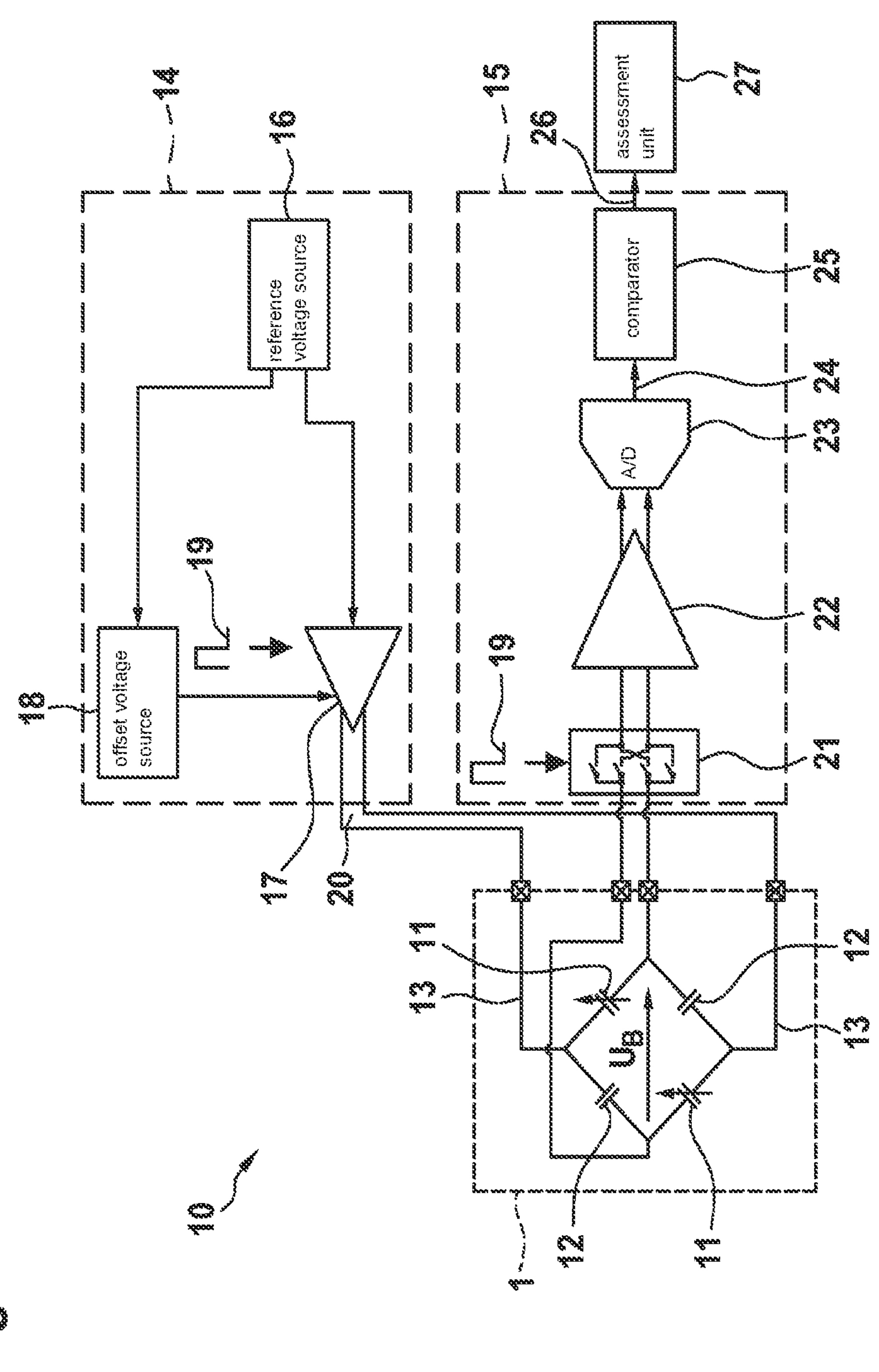
FIG. 3 shows a circuit diagram comprising elements of an embodiment of a sensor system according to the present invention.

FIG. 3 shows a circuit diagram having elements of an exemplary embodiment of a sensor system according to the present invention. The sensor system 10 comprises a sensor 1 comprising four capacitors 11, 12 connected in a Wheatstone full-bridge: two sensor capacitors 11 dependent on an external pressure and two reference capacitors 12. An excitation signal 20 is input at the ends 13 of the Wheatstone bridge, which signal is generated and output by a driver unit 14. The bridge voltage UB of the Wheatstone bridge is input into an evaluation unit 15.

The driver unit 14 comprises a reference voltage source 16, a chopper circuit 17, and an offset voltage source 18. A reference voltage generated by the reference voltage source 16 is fed into the chopper circuit 17, which generates and outputs an excitation signal 20, based on a chopper signal 19. The excitation signal 20 changes between the reference voltage and a low level, which in this case is formed by the inverted reference voltage. The offset voltage source 18 can be used to shift the excitation signal 20 to higher or lower voltages.

The evaluation unit 15 comprises a rectifier 21, an amplifier 22, and an analog-digital converter 23. The bridge voltage UB tapped from the Wheatstone bridge is fed into the rectifier 21 and is rectified there to a positive voltage. In the illustrated case, this is done using the chopper signal 19. The rectified signal is fed into the amplifier 22, and the signal amplified by the amplifier 22 is converted into a digital sensor signal 24 by the analog-digital converter 23. This digital sensor signal 24 is fed into a comparator 25, in which a response behavior is extracted from the digital sensor signal 24 and compared to a reference behavior. A measure of deviation 26 determined in this manner is fed into an assessment unit 27. Based on the measure of deviation, the state of the sensor is assessed in said unit with respect to the presence of a deposit.

FIG. 4 is a flow diagram showing steps of an exemplary embodiment of a method for assessing the state of a sensor. In step S1, the performance of the method is triggered. This may be done, e.g., by a host system. In step S2, an excitation signal is generated. In the illustrated exemplary embodiment, there are various options for how this excitation signal can be generated. According to step S2.1, a single pulse is generated. According to step S2.2, a plurality of pulses are generated. According to step 2.3, an excitation signal is generated which dynamically excites the micromechanical sensor structure in a normal mode. In the two parts of step 2.4, a static deflection is generated by an offset voltage (step 2.4.1), which is added to an excitation signal that dynamically excites in in the normal mode (step 2.4.2). In step 2.5, other excitation signals are generated, e.g., a sinusoidal excitation signal at an increasing frequency. In step S3, the generated excitation signal is applied to the micromechanical sensor structure, thus effecting a deflection of the micromechanical sensor structure.

In step S4, the response behavior of the micromechanical sensor structure to the excitation signal is detected. This response behavior is averaged according to step S4.1, based on the retroactive effect of the micromechanical sensor structure on the excitation signal, e.g., by determining a quality factor or by determining an impedance. In step S4.2, which is performed alternatively or in parallel to step S4.1, a sensor signal is detected, and from it the response behavior is detected.

In step S5, the detected response behavior is compared with a reference behavior characterizing a normal state of the sensor. In the comparison, a measure of deviation is determined, which must be less than a predefined first limit value for detecting a normal state. In step S6, it is checked whether a normal state exists. If this is true ("Yes"; left branch from step S6), then the measured values of the sensor continue to be trusted in step S7, and the method then ends. If a normal state does not exist ("No"; right branch from step S6), then this is followed by further checks.

As a first step in this further check, it is first checked in step S8 whether a general malfunction exists. To this end, it can be checked whether the distance between the response behavior and the reference behavior characterizing the normal state of the sensor exceeds a predefined second limit value. Alternatively, the response behavior can be compared to another reference behavior characterizing anerroneous behavior of the sensor. If a malfunction exists ("Yes"; left branch from step S8), then the further measured values of the sensor are no longer trusted (step S9.1). Alternatively or additionally, a restart of the sensor electronics can be triggered in step S9.2, which can in many cases correct a malfunction. After step S9.1 or S9.2, the method is ended.

If no malfunction exists ("No"; right branch from step S8), then it is checked in step S10 whether a deposit is present. For this purpose, the detected response behavior is compared with one (or also multiple) further reference behavior(s) characterizing a deposit on the sensor. If the response behavior can be associated with one of the deposits examined ("Yes"; left branch from step S10), then the type of the deposit is determined in step S11.1, and the mass of the deposit is determined in step S11.2. Depending on the extent of the deposit, a measured value generated by the sensor may be mistrusted (step S12.1), or a compensation for the measured values generated may be initiated (step S12.2). If the detected response behavior cannot be associated with one of the further reference behaviors ("No"; right branch from step S10), then a measured value generated by the sensor is generally mistrusted in step 13.

Figure 5:
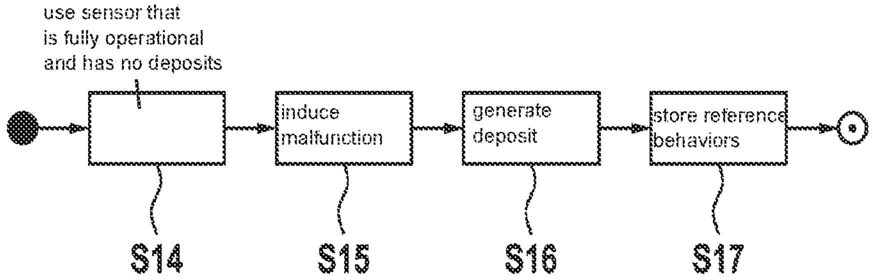
FIG. 5 shows a flow diagram with steps for generating reference behaviors, according to the present invention.

FIG. 5 is a flow diagram showing steps that can be used in order to generate a reference behavior. In step S14, a sensor is first used that is fully operational and has no deposits. An excitation signal is applied to the sensor, and a response behavior is detected. In step S15, a malfunction of the sensor is deliberately induced, in that the micromechanical structure is fixed in place adhesive, for example. An excitation signal is in this case also applied to the micromechanical sensor structure, and a response behavior is detected. In step S16, a deposit is deliberately generated on a sensor that is in principle operational, e.g., by applying a drop of water. An excitation signal is applied to the micromechanical sensor structure in this case as well, and a response behavior is detected. In step S17, reference behaviors are stored. These reference behaviors can be formed by the response behaviors of the sensor in the respective known state (normal state, fixed in place by adhesive, deposit 1, deposit 2, . . . ). It is also possible that the response behaviors still be converted, e.g., by forming a mean value from multiple measurements and/or for a plurality of different sensors and/or a normalization of obtained values.

Figure 6:
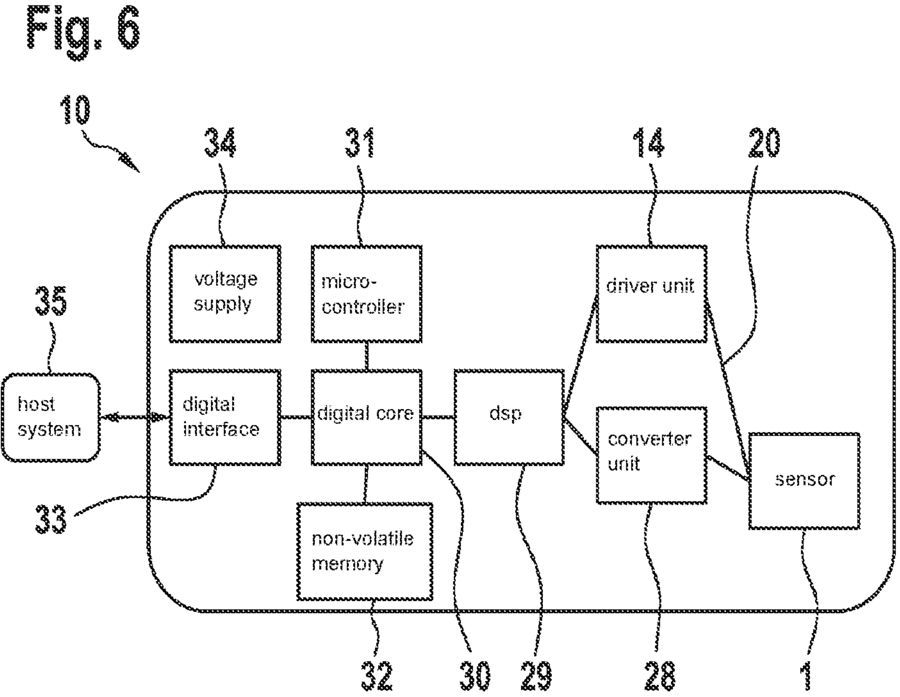
FIG. 6 shows a block diagram of functional units of an embodiment example of a sensor system according to the present invention.

FIG. 6 is a block diagram showing functional units of an exemplary embodiment of a sensor system according to the present invention. The sensor system 10 comprises a sensor 1, to which an excitation signal 20 can be applied by a driver unit 14. A converter unit 28, in which an analog front-end, an analog-digital converter, and possibly further units for preprocessing a sensor signal are combined, receives a sensor signal from the sensor 1 and generates from this a digitized measured value. This digitized measured value is fed into a digital signal processor 29, which controls the generation of the excitation signal 20 on the one hand, evaluates the digitized measured value on the other hand, and determines a response behavior of the sensor 1. The digital signal processor 29 is connected to a digital core 30, which performs the further processing of the response behavior and the assessment of the state of the sensor 1. For this purpose, the digital core 30 can make use of a micro-controller 31 and can load data, e.g., reference behaviors, from a non-volatile memory 32. The results may be output via a digital interface 33. The individual aforementioned functional units are supplied with energy by a voltage supply 34. The digital interface 33 may be used to communicate with a host system 35.

Figure 7:
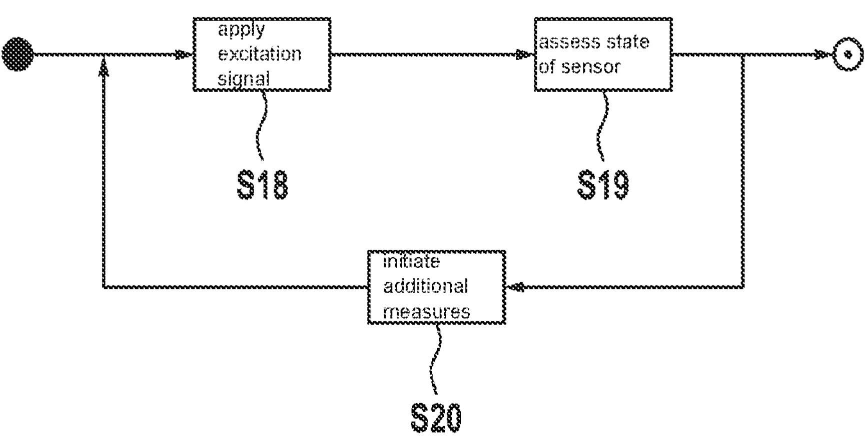
FIG. 7 shows a flow diagram for an embodiment of a method according to the present invention comprising a control loop.

FIG. 7 is a flow diagram showing an embodiment of a method comprising a control loop. In step S18, an excitation signal is applied to the micromechanical sensor structure, the response behavior of the micromechanical sensor structure is detected, and a measure of deviation between the response behavior and a reference behavior is determined. In step S19, the measure of deviation is used to assess the state of the sensor. If it turns out that there are deviations from a normal state in need of correction or that their effects should be reduced, then additional measures are initiated in step S20. In the present case, these additional actions include generating high-energy oscillation, which can break down deposits. The method returns to steps S18 and S19 to assess the effectiveness of these additional measures and the state is assessed anew. If the state is again a normal state, or it has approached a normal state, the method exits from the loop. A loop counter may be provided that counts each pass of the loop and, if a predetermined number of passes are exceeded, it terminates the loop and outputs an error.

Although the present invention was described with reference to preferred exemplary embodiments, it is not limited thereto, but rather can be modified in a variety of ways.

The invention claimed is:

1. A method for assessing a state of a sensor, the sensor including a deflectable micromechanical sensor structure in the form of a suspended electrode and two fixed reference electrodes and two fixed measuring electrodes, wherein a capacitance of the measuring electrodes that is changed due to a change in pressure of a surrounding medium acting on the micromechanical sensor structure is detected and the suspended electrode is deflected via an excitation signal, wherein the micromechanical sensor structure is configured to detect a physical input variable and to convert the physical input variable into an electrical sensor signal, and wherein the micromechanical sensor structure is deflectable using the excitation signal, the method comprising the following steps:

- generating the excitation signal using a driver unit, wherein the excitation signal exhibits at least an amplitude change;
- outputting the excitation signal to the micromechanical sensor structure;
- deflecting the micromechanical sensor structure using the excitation signal;
- detecting a response behavior of the micromechanical sensor structure in response to the excitation signal;
- comparing the response behavior to a reference behavior to determine a measure of deviation for the response behavior in relation to the reference behavior, where the reference behavior represents a normal state of the sensor; and
- assessing, based on the measure of deviation, the state of the sensor with respect to presence of a deposit.

2. The method according to claim 1, wherein, during the step of detecting the response behavior, a retroactive effect of the micromechanical sensor structure on the excitation signal is detected.

3. The method according to claim 1, wherein, during the step for detecting the response behavior, a response signal is detected, wherein the response signal is formed by a sensor signal of the sensor when the micromechanical sensor structure is deflected by the excitation signal.

4. The method according to claim 3, wherein, during the step of generating the excitation signal, the excitation signal is adjusted such that a desired response signal is detected.

5. The method according to claim 1, wherein the excitation signal is generated as a single pulse, and/or as a plurality of pulses, and/or as a periodic oscillation with a constant or variable frequency, and/or as a variously shaped single or repeated pattern.

6. The method according to claim 5, wherein a DC voltage is superimposed on the excitation signal.

7. The method according to claim 1, wherein, during the step of detecting the response behavior, a frequency of a sensor signal, and/or an amplitude of a sensor signal, and/or a resonance frequency, and/or a quality factor, and/or a mechanical impedance, and/or an electrical impedance, and/or a natural frequency, and/or other parameters of a response behavior of the micromechanical sensor structure, is determined.

8. The method according to claim 1, wherein during the step of comparing the response behavior with the reference behavior, an assessment is made of how far away the micromechanical sensor structure is from the normal state and/or whether an error state of the sensor exists.

9. The method according to claim 1, wherein the reference behavior represents a micromechanical sensor structure influenced by a first deposit, wherein the first deposit is formed by a liquid, or a solid, or a solid structure, and during the step of comparing the response behavior with the reference behavior, an assessment is made of how close the behavior of the micromechanical sensor structure is to a behavior of a micromechanical sensor structure influenced by the first deposit.

10. The method according to claim 1, wherein the reference behavior has been determined: (i) in an initial measurement, and/or in a previous measurement, and/or in a measurement on a structurally identical sensor, and/or in a simulation, and/or by a calculation.

11. The method according to claim 1, wherein, during the step for assessing the state of the sensor, a reliability of obtained sensor data is determined and/or a measure for an error correction is obtained, as a function of the reference behavior and the measure of deviation.

12. The method according to claim 1, wherein additional measures are triggered during the step of assessing the sensor, the additional measures including a restoration of the normal state, and/or a status update, and/or a deactivation of the sensor and/or mitigation measures, wherein an assessment of the state of the sensor and the triggering of the additional measures are performed in the form of a control loop.

13. A sensor system, comprising:

- a sensor having a deflectable micromechanical sensor structure in the form of a suspended electrode and two fixed reference electrodes and two fixed measuring electrodes, wherein a capacitance of the measuring electrodes that is changed due to a change in pressure of a surrounding medium acting on the micromechanical sensor structure is detected and the suspended electrode is deflected via an excitation signal, wherein the micromechanical sensor structure is configured to detect a physical input variable and to convert the physical input variable into an electrical sensor signal, wherein a medium surrounds the sensor and directly or indirectly acts on the micromechanical sensor structure, and wherein the micromechanical sensor structure is deflectable using the excitation signal;

a driver unit configured to generate and output the excitation signal, the excitation signal exhibiting at least an amplitude change;

an evaluation unit configured to determine a response behavior of the micromechanical sensor structure in response to the excitation signal, and to form a measure of deviation based on a comparison of the response behavior with a reference behavior; and an assessment unit configured to assess a state of the sensor with respect to presence of a deposit, based on the measure of deviation.

14. The sensor system according to claim 13, wherein the driver unit and the evaluation unit are configured as separate units, or the evaluation unit is a component of the driver unit.

15. The sensor system according to claim 13, wherein the driver unit and the evaluation unit are configured to be used for obtaining a measured value for the physical input variable during a measurement operation and, during a pause of the measurement operation, to be used for assessing the state of the sensor.

16. The sensor system according to claim 13, further comprising a host system, wherein the host system is connected to the evaluation unit and/or the assessment unit so as to communicate via an interface, wherein the host system is configured to initiate an assessment of the state of the sensor and/or to implement at least parts of the assessment unit.

17. A method for operating a sensor system, the sensor system including: (i) a sensor having a deflectable micromechanical sensor structure in the form of a suspended electrode and two fixed reference electrodes and two fixed measuring electrodes, wherein a capacitance of the measuring electrodes that is changed due to a change in pressure of a surrounding medium acting indirectly on the micromechanical sensor structure is detected and the suspended electrode is deflected via an excitation signal, wherein the micromechanical sensor structure is configured to detect a physical input variable and to convert the physical input variable into an electrical sensor signal, wherein a medium surrounds the sensor and directly or indirectly acts on the micromechanical sensor structure, and wherein the micromechanical sensor structure is deflectable using the excitation signal; (ii) a driver unit configured to generate and output the excitation signal, the excitation signal exhibiting at least an amplitude change; (iii) an evaluation unit configured to determine a response behavior of the micromechanical sensor structure in response to the excitation signal, and to form a measure of deviation based on a comparison of the response behavior with a reference behavior; and (iv) an assessment unit configured to assess a state of the sensor with respect to presence of a deposit, based on the measure of deviation, the method comprising the following steps:

detecting, using the sensor system, a physical input variable, and converting, using the sensor system, the detected physical input variable into an electrical sensor signal; and performing, automatically at regular intervals and/or in an event-initiated manner and/or as initiated by a host system:

generating the excitation signal using the driver unit, outputting the excitation signal to the micromechanical sensor structure, deflecting the micromechanical sensor structure using the excitation signal, detecting the response behavior of the micromechanical sensor structure in response to the excitation signal, comparing the response behavior to the reference behavior to determine the measure of deviation for the response behavior in relation to the reference behavior, and assessing, based on the measure of deviation, the state of the sensor with respect to the presence of the deposit.

* * * * *